United States Patent
Hall et al.

(10) Patent No.: US 10,088,563 B2
(45) Date of Patent: Oct. 2, 2018

(54) GROUND PENETRATING RADAR WITH MULTIPLE CORRELATORS

(71) Applicant: Novatek IP, LLC, Provo, UT (US)

(72) Inventors: David R. Hall, Provo, UT (US); David C. Wahlquist, Spanish Fork, UT (US)

(73) Assignee: NOVATEK IP, LLC, Provo, UT (US)

( * ) Notice: Subject to any disclaimer, the term of this patent is extended or adjusted under 35 U.S.C. 154(b) by 412 days.

(21) Appl. No.: 14/873,786

(22) Filed: Oct. 2, 2015

(65) Prior Publication Data

US 2016/0025851 A1  Jan. 28, 2016

Related U.S. Application Data

(63) Continuation-in-part of application No. 13/956,034, filed on Jul. 31, 2013, now Pat. No. 9,541,640.

(60) Provisional application No. 61/678,377, filed on Aug. 1, 2012, provisional application No. 62/059,254, filed on Oct. 3, 2014.

(51) Int. Cl.
  *G01S 7/28* (2006.01)
  *G01S 13/88* (2006.01)
  *G01S 13/10* (2006.01)
  *E01C 23/088* (2006.01)

(52) U.S. Cl.
  CPC .............. *G01S 13/885* (2013.01); *G01S 7/28* (2013.01); *G01S 13/103* (2013.01); *E01C 23/088* (2013.01)

(58) Field of Classification Search
  CPC ......... G01S 13/103; G01S 13/885; G01S 7/28
  USPC ........................................................... 342/22
  See application file for complete search history.

(56) References Cited

U.S. PATENT DOCUMENTS

| | | | |
|---|---|---|---|
| 5,835,054 A | 11/1998 | Warhus et al. | |
| 6,002,357 A * | 12/1999 | Redfern | G01V 3/12 342/126 |
| 6,121,915 A | 9/2000 | Cooper et al. | |
| 6,496,137 B1 | 12/2002 | Johansson | |

* cited by examiner

*Primary Examiner* — Timothy A Brainard

(57) ABSTRACT

A subsurface detection system may be capable of sensing a buried feature and providing an estimate of the feature's depth. Such a subsurface detection system may comprise a signal generator transmitting at least one signal toward a buried feature and at least one signal along a plurality of various length paths. Each of a plurality of correlators may be associated with one of the various length paths and receive both a signal reflected by the feature and a signal transmitted along one of the various length paths. Each of the correlators may correspond to a distance to the buried feature. As the reflected signal reaches each correlator it may identify a time offset between the arrival of the reflected signal and the signal transmitted along one of the various length paths. By so doing, a distance to the buried feature may be estimated by detecting the correlator with the shortest time offset.

19 Claims, 5 Drawing Sheets ns and 62/059,254
GROUND PENETRATING RADAR WITH MULTIPLE CORRELATORS

CROSS REFERENCE TO RELATED APPLICATIONS

This application claims priority to U.S. Provisional Pat. App. Nos. 61/678,377 filed Aug. 1, 2012 and 62/059,254 filed Oct. 3, 2014. This application is also a continuation-in-part of U.S. patent application Ser. No. 13/956,034 filed Jul. 31, 2013. These applications are incorporated herein by reference for all that they contain.

BACKGROUND OF THE INVENTION

Ground penetrating radar (GPR) systems are commonly used to detect objects, voids, cracks, or material interfaces beneath a surface. They may do so by emitting electromagnetic energy into the surface and measuring energy reflected back to the surface. The present invention relates to GPR systems and especially to the depth measurements performed by many GPR systems.

One example of such a GPR system is shown in U.S. Pat. No. 5,835,054 to Warhus et al., which describes a plurality of radar antennas directed at a surface that issue radar bursts and receive reflections from a range of depths under the surface. Timing of the bursts along with scanner signal selection is performed by a timing generator. Despite its advantages, Warhus describes the possibility of such GPR systems becoming overrun by the collected data. Warhus also describes how accuracy of such systems is dependent on how precisely the time-delay of echoes can be measured with each returned echo ideally being a scaled and time-shifted version of the transmitted pulse. Thus, simplified means for timing GPR systems may be desirable.

U.S. Patent Pub. No. 2015/0035693 to Hall et al. describes one effort to simplify the timing of GPR systems. Hall describes a signal generator transmitting one or more signals with one of the signals reflected off of a buried object back to the system and one of the signals transmitted along a variable length path. A correlator receives the signals and determines an offset between their arrival times. The variable length path may then be adjusted over a range to minimize the offset thus indicating a distance to the object. While this design offered significant improvements over that of Warhus in terms of simplicity, it also required time to adjust the variable length path. Thus, a simplified and faster GPR system may be desirable.

BRIEF SUMMARY OF THE INVENTION

A subsurface detection system may be capable of sensing a buried feature and providing an estimate of the feature's depth. The subsurface detection system may comprise a signal generator transmitting one or more signals. At least one of the signals may be directed toward a buried feature. At least one of the signals may be transmitted along a plurality of various length paths. Each of a plurality of correlators may be associated with one of the various length paths and receive both a signal reflected by the feature and a signal transmitted along one of the various length paths.

Each of the individual various length paths may correspond to a distance to the buried feature. As the signal reflected by the feature reaches each correlator the correlator may identify a time offset between the arrival of the signal reflected by the feature and the signal transmitted along one of the various length paths. By so doing, a distance to the buried feature may be estimated by detecting the correlator with the shortest time offset. In other embodiments, the time offset of each of the plurality of correlators may be used to approximate a distance to the feature.

In some embodiments of such a subsurface detection system, the various length paths may be formed from a number of sections connected in series. In some embodiments, the signal directed toward the feature and the signal transmitted along the various length paths may be substantially identical, random, and/or generated concurrently. In various embodiments, a transmitter for transmitting the signal directed toward the feature and a receiver for receiving the signal reflected by the feature may be one, comprising a single antenna.

Additionally, at least one delay may be incorporated into one of the various length paths to alter a length of the various length path. Further, in some embodiments, each of the various length paths may comprise at least one delay to alter a length of that various length path.

Such a subsurface detection system may be secured to a vehicle such as a truck or a degradation machine with a degradation drum disposed thereon. When forming part of a degradation machine, a height of the degradation drum or a height of the machine itself may be adjustable to avoid engaging the feature. Such a subsurface detection system may alternately be secured to a handheld frame. When secured to a truck or handheld frame, the subsurface detection system may comprise electronic storage to hold correlator data for later use. The electronic storage may also hold positioning data corresponding to the correlator data.

DETAILED DESCRIPTION OF THE INVENTION

Figure 1:
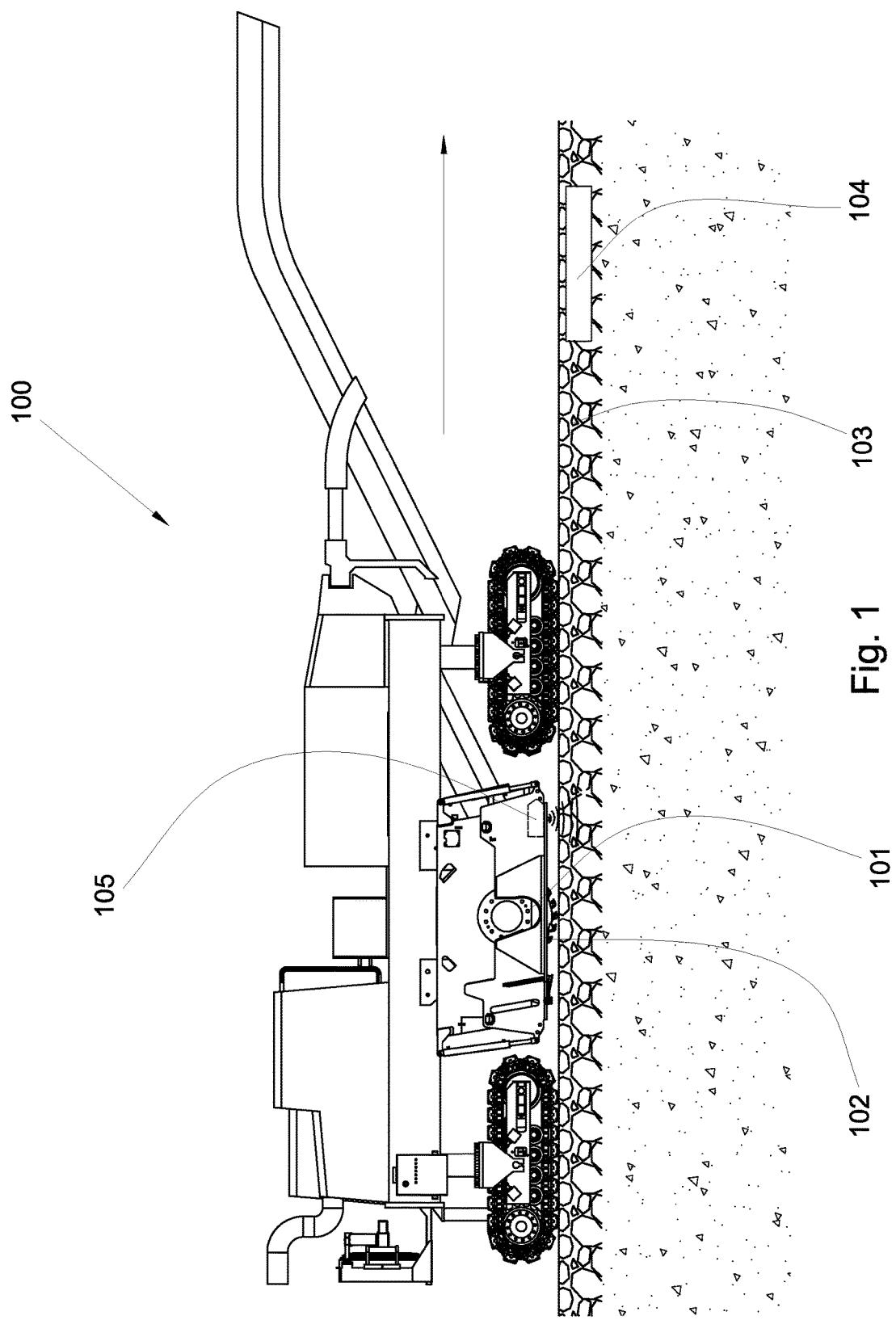
FIG. 1 is an orthogonal view of an embodiment of a vehicle comprising a subsurface detection system disposed thereon.

FIG. 1 discloses an embodiment of vehicle 100, such as a road milling machine, traveling over a surface 103, such as asphalt or concrete. A degradation drum 101 comprising a plurality of picks 102 disposed around an outer perimeter thereof may be secured to an underside of the vehicle 100. The degradation drum 101 may be rotated such that the plurality of picks 102 engage and degrade the surface 103.

An object 104 such as rebar, railroad tracks or a manhole cover may be buried beneath the surface 103 and may damage the picks 102 if impacted thereby. To prevent damage to the picks 102, a subsurface detection system 105 comprising a ground penetrating radar unit may be disposed on the vehicle 100 to locate and collect information about such buried objects. By so doing, a height of the degradation drum 101 or the vehicle 100 may be adjusted to avoid engaging the object 104 with the picks 102.

Figure 2:
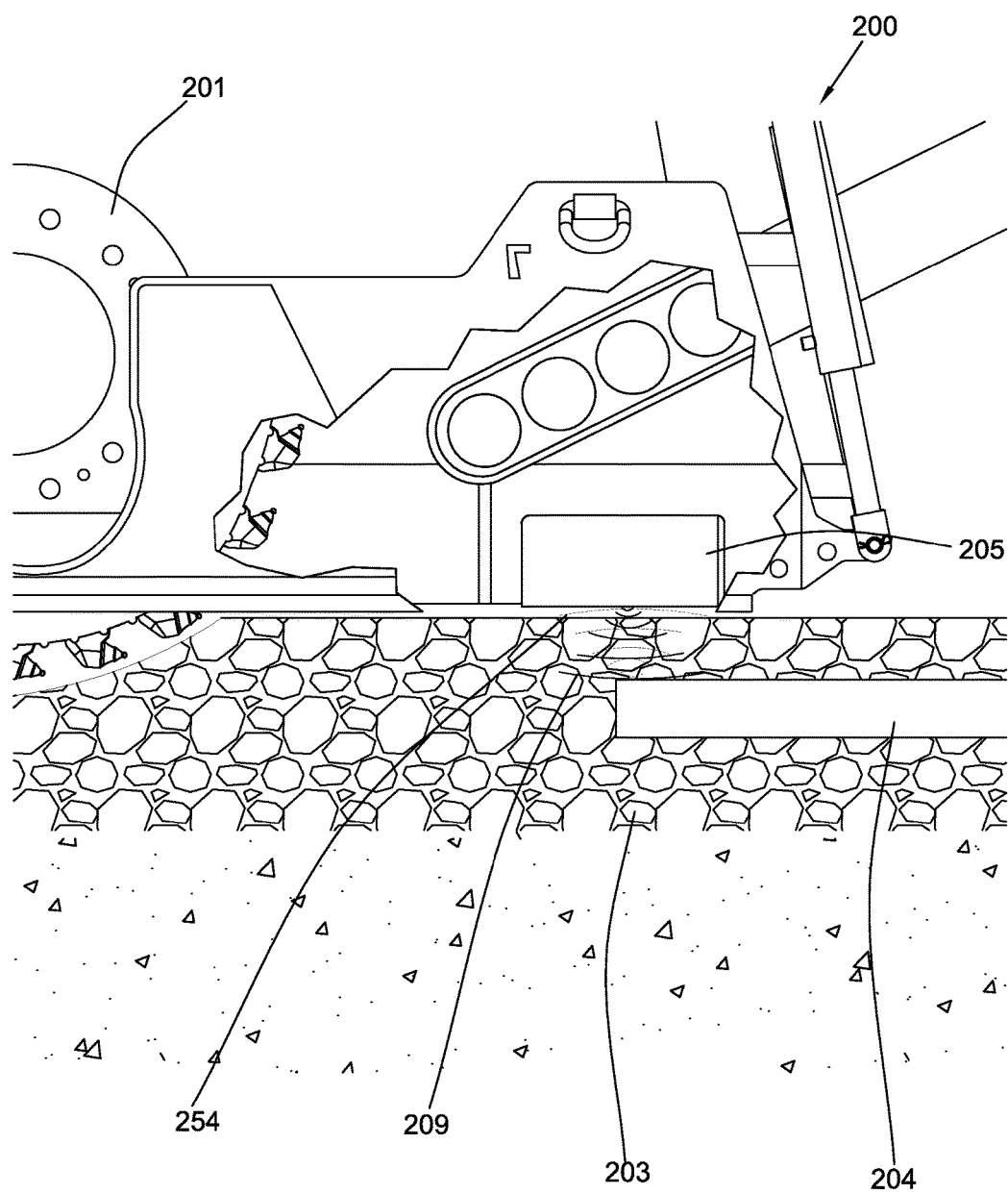
FIG. 2 is a cutaway view of an embodiment of a subsurface detection system disposed on a vehicle.

FIG. 2 discloses a portion of an embodiment of a vehicle 200 similar to the one referenced in the discussion of FIG. 1 comprising a degradation drum 201 secured to an underside thereof. A subsurface detection system 205 may be secured on the vehicle 200 forward of the degradation drum 201. The subsurface detection system 205 may locate buried objects 204 prior to them being engaged by the degradation drum 201 by transmitting electromagnetic energy 209 into a subsurface region 203 within which the buried objects 204 may be located and collecting reflected energy 254 that may reflect off of the buried objects 204. The time required for the reflected energy 254 to return to the subsurface detection system 205 may be used to estimate a distance to the buried objects 204.

Figure 3:
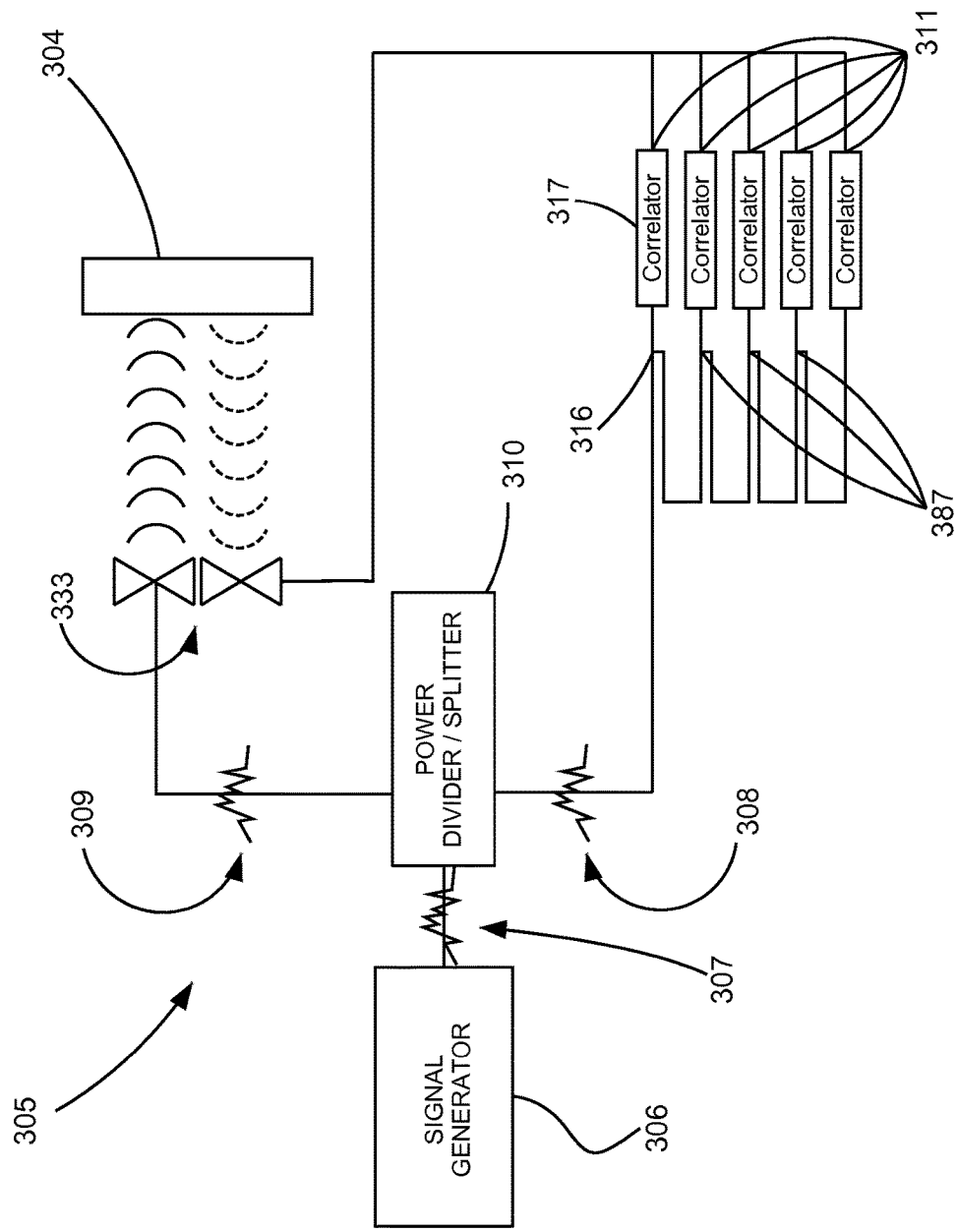
FIG. 3 is a schematic block diagram of an embodiment of a subsurface detection system comprising multiple correlators.

FIG. 3 discloses an embodiment of a subsurface detection system 305 in schematic form. Wire connections are shown between circuit elements, however, those of skill in the art will recognize that lower frequency radio signals may be carried on short wires while higher frequency radio signals may be carried on transmission lines such as microstrip, stripline, coaxial cables, or other types of transmission lines. In the embodiment shown, the subsurface detection system 305 comprises a signal generator 306 that may transmit one or more signals 307. In various embodiments, the signals 307 may be uniform or random. The signals 307 may be split by a power divider or splitter 310 into first and second signals 308 and 309 respectively. Upon leaving the power divider or splitter 310, the first and second signals 308 and 309 may travel along two distinct paths to a plurality of correlators 311 where they may be compared to determine the relative delays between the paths traveled.

For example, the first signal 308 may travel through any number of delays 387. Each of the delays 387 may form a different length of travel path for the first signal 308. Additionally, each of the delays 387 may connect to one of the plurality of correlators 311.

The second signal 309 may travel along a path including a transmitter/receiver device 333, such as an antenna, that may transmit the second signal 309 toward an object 304. The second signal 309 may reflect off of the object 304 and be received again by the transmitter/receiver device 333.

Each of the plurality of correlators 311 may simultaneously compare the first signal 308 (after having traveled a specific distance) to the second signal 309. If the first signal 308 and second signal 309 are substantially in phase when they reach any of the plurality of correlators 311 then they may have traveled a substantially related distance. For example, a first delay 316 may correspond to a short distance and a first correlator 317. If the first signal 308 and second signal 309 are substantially in phase at the first correlator 317 then a distance to the object 304 may be estimated from the first delay 316. If not, then a delay leading to another correlator with the shortest time offset between arrival of the first signal 308 and second signal 309 may be used to estimate the distance to the object 304.

Figure 4A:
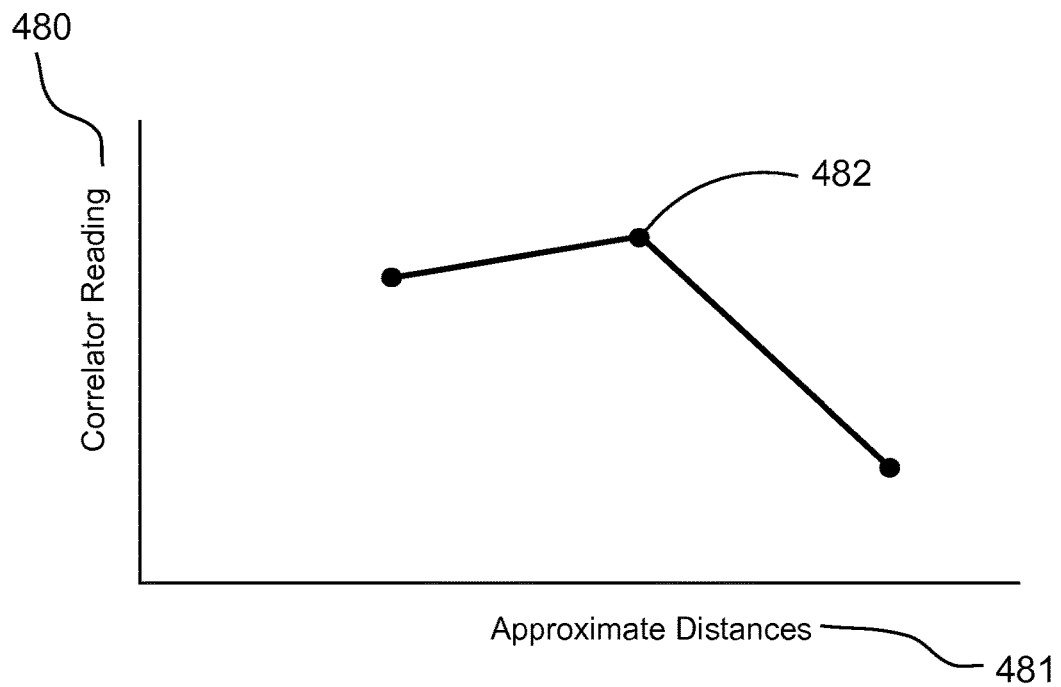
FIGS. 4a and 4b are graphical representations of embodiments of a plurality of correlator readings related to approximate distances.
Figure 4B:
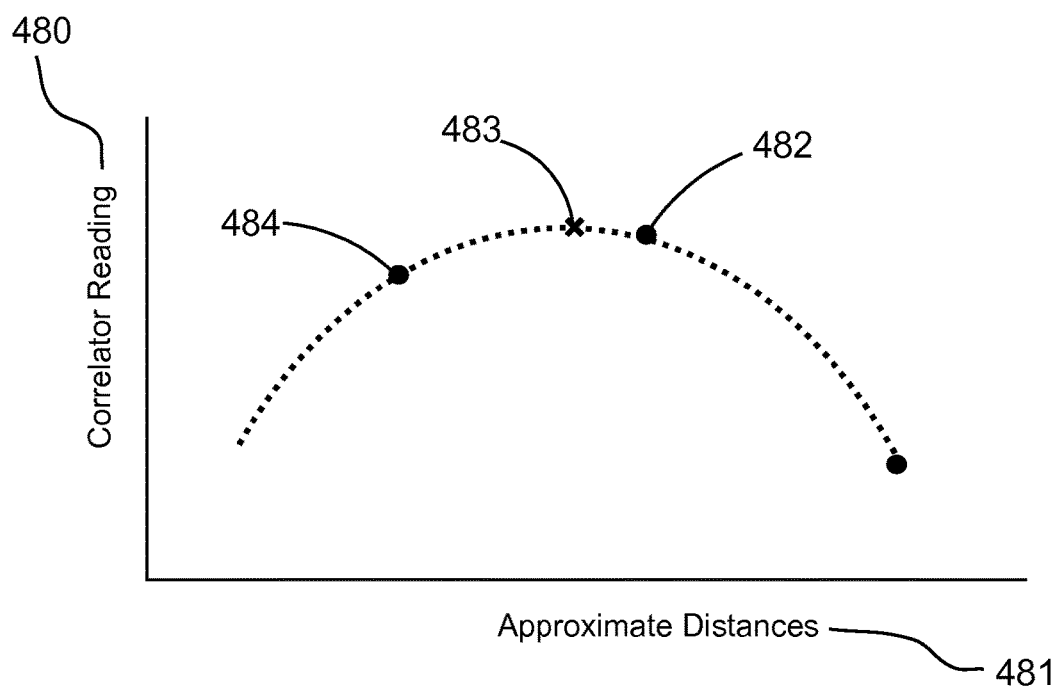

In some embodiments, the time offset of a number of correlators may be used to approximate a distance to the object. For example, FIG. 4a shows an embodiment of a plurality of correlator readings 480 each related to unique approximate distances 481 to a subsurface object. In the embodiment shown, the middle reading 482 is the highest and thus may be used to approximate the distance. However, as shown in FIG. 4b, in other embodiments an apex 483 of a parabola laid over the plurality of correlator readings 480 may be used to estimate a distance to the object with even more accuracy. In the embodiment shown, the apex 483 representing an approximate distance to the object may sit between a first reading 484 and the middle reading 482.

Figure 5A:
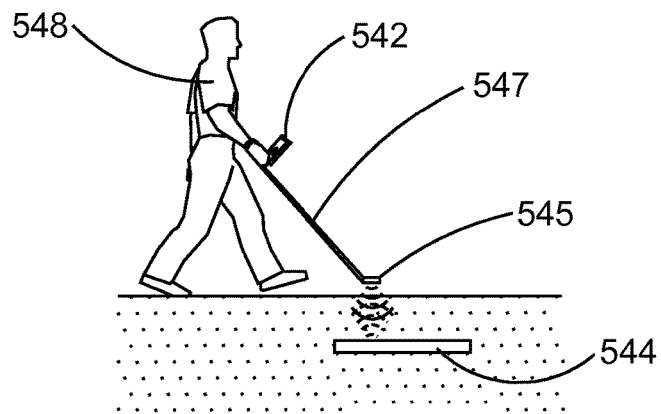
FIG. 5a is an orthogonal view of an embodiment of a handheld subsurface detection system.

FIG. 5a discloses an embodiment of a handheld subsurface detection system 545 disposed on an end of an elongate frame 547 carried by an operator 548. The subsurface detection system 545 may locate buried objects 544 by transmitting electromagnetic energy into a surface and collecting reflected energy that may reflect off of the buried objects 544. The time required for the reflected energy to return to the subsurface detection system 545 may be used to estimate a distance to the buried objects 544. A display 542 may also be disposed on the elongate frame 547 to show a distance to the objects 544.

Figure 5B:
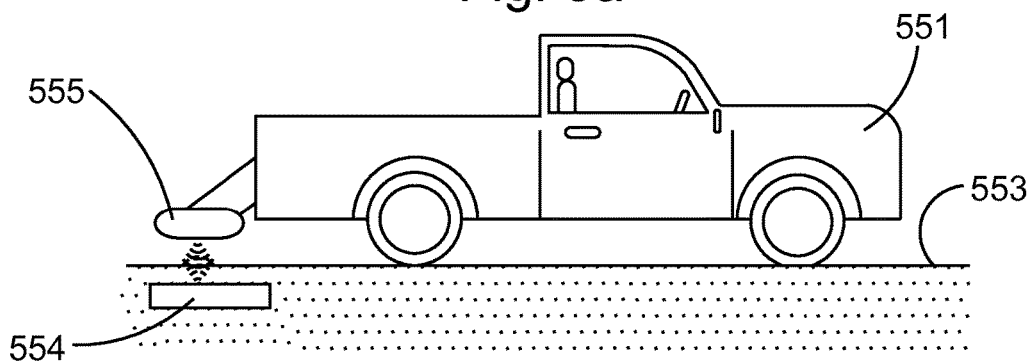
FIG. 5b is an orthogonal view of an embodiment of a truck comprising a subsurface detection system.

FIG. 5b discloses an embodiment of a subsurface detection system 555 attached to a vehicle 551, such as a truck. The vehicle 551 may drive over a surface 553 to be degraded. The subsurface detection system 555 may locate objects 554 buried beneath the surface 553. The subsurface detection system 555 may record data identifying locations and depths of the objects 554 beneath the surface 553. This data may be referenced later when degrading the surface 553.

Figure 5C:
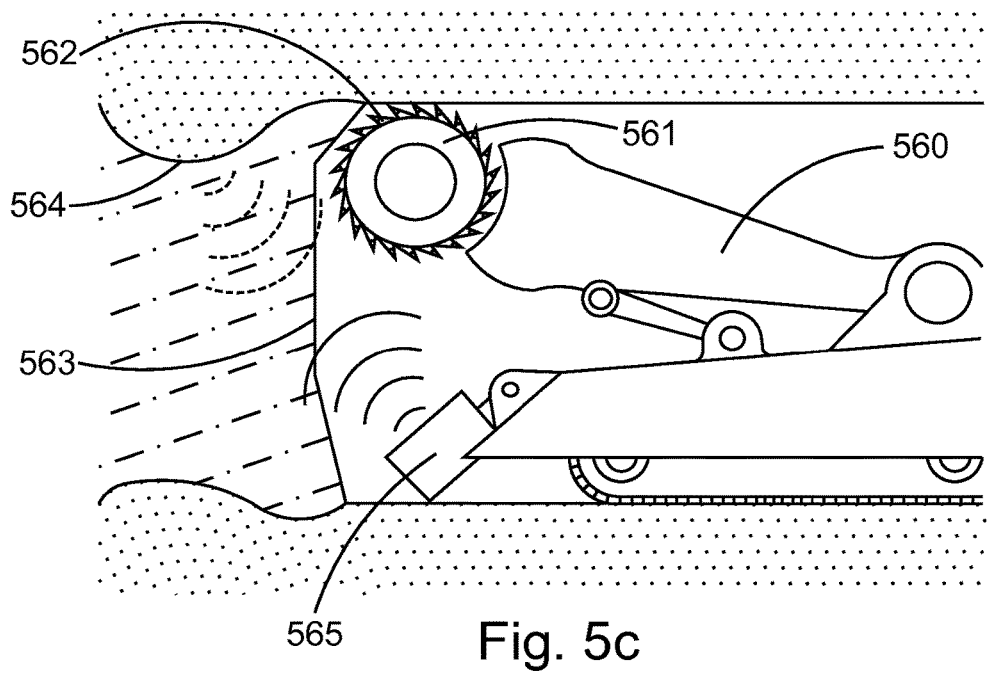
FIG. 5c is an orthogonal view of an embodiment of a mining machine comprising a subsurface detection system.

FIG. 5c discloses an embodiment of a mining machine 560. A degradation drum 561 comprising a plurality of picks 562 disposed around an outer perimeter thereof may be secured to the mining machine 560. The degradation drum 561 may be rotated such that the plurality of picks 562 engage and degrade a formation 563.

The formation 563 may be disposed adjacent potentially damaging objects 564. For example, valuable coal formations are often found adjacent tough rock formations that may damage mining machines, drums and picks when encountered. To prevent damage to the picks 562, a subsurface detection system 565 may be disposed on the mining machine 560 to locate and collect information about the potentially damaging objects 564. Thus, the degradation drum 561 or the mining machine 560 may be adjusted to avoid engaging the potentially damaging objects 564 based on information collected from the subsurface detection system 565.

Whereas the present invention has been described in particular relation to the drawings attached hereto, it should be understood that other and further modifications apart from those shown or suggested herein, may be made within the scope and spirit of the present invention.

The invention claimed is:

1. A subsurface detection system, comprising:
   a signal generator transmitting one or more signals, the one or more signals having;
      at least one of the one or more signals directed toward a feature for reflection by the feature as at least one reflected signal; and
      at least one of the one or more signals transmitted along a plurality of various length paths; and
   a plurality of correlators each receiving:
      the at least one reflected signal reflected by the feature; and
      a received signal of the at least one of the one or more signals transmitted along the plurality of the various length paths, the received signal having been transmitted along one of the various length paths.

2. The subsurface detection system of claim 1, wherein each of the various length paths corresponds to a distance to the feature.

3. The subsurface detection system of claim 1, wherein each of the plurality of correlators identifies a time offset between arrival of the at least one reflected signal and the received signal transmitted along one of the various length paths.

4. The subsurface detection system of claim 3, wherein a correlator of the plurality of correlators identifying the shortest time offset corresponds to an approximate distance to the feature.

5. The subsurface detection system of claim 3, wherein the time offset of each of the plurality of correlators is used to approximate a distance to the feature.

6. The subsurface detection system of claim 1, wherein the various length paths are formed by a number of sections connected in series.

7. The subsurface detection system of claim 1, wherein the at least one of the one or more signals directed toward the feature for reflection by the feature as the at least one reflected signal and the at least one of the one or more signals transmitted along the plurality of various length paths are substantially identical.

8. The subsurface detection system of claim 7, wherein the at least one of the one or more signals directed toward the feature for reflection by the feature as the at least one reflected signal and the at least one of the one or more signals transmitted along the plurality of various length paths are random.

9. The subsurface detection system of claim 1, wherein the at least one of the one or more signals directed toward the feature for reflection by the feature as the at least one reflected signal and the at least one of the one or more signals transmitted along the plurality of various length paths are generated concurrently.

10. The subsurface detection system of claim 1, further comprising a transmitter for transmitting the at least one signal directed toward the feature for reflection by the feature as the at least one reflected signal and a receiver for receiving the at least one reflected signal.

11. The subsurface detection system of claim 10, wherein the transmitter and receiver comprise a single antenna.

12. The subsurface detection system of claim 1, further comprising at least one delay incorporated into one of the various length paths to alter a length of the various length path.

13. The subsurface detection system of claim 1, wherein each of the various length paths comprises at least one delay to alter a length of that various length path.

14. The subsurface detection system of claim 1, secured to a vehicle.

15. The subsurface detection system of claim 14, wherein the vehicle comprises a degradation drum wherein a height of the degradation drum is adjustable to avoid engaging the feature.

16. The subsurface detection system of claim 14, wherein a height of the vehicle is adjustable to avoid engaging the feature.

17. The subsurface detection system of claim 1, secured to a handheld frame.

18. The subsurface detection system of claim 1, further comprising electronic storage to hold correlator data.

19. The subsurface detection system of claim 18, wherein the electronic storage also holds positioning data corresponding to the correlator data.

* * * * *